(12) United States Patent
Song

(10) Patent No.: US 7,104,592 B2
(45) Date of Patent: Sep. 12, 2006

(54) LATERAL STIFFNESS REINFORCEMENT DEVICE OF VEHICLE BODY

(75) Inventor: June-Young Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 58 days.

(21) Appl. No.: 11/028,179

(22) Filed: Jan. 4, 2005

(65) Prior Publication Data

US 2006/0038428 A1    Feb. 23, 2006

(30) Foreign Application Priority Data

Aug. 17, 2004   (KR)  ................... 10-2004-0064865

(51) Int. Cl.
*B60J 7/00* (2006.01)
(52) U.S. Cl. ............... 296/187.12; 296/68.1; 297/216.13
(58) Field of Classification Search .......... 296/187.12, 296/68.1, 24.34, 37.8; 297/216.13
See application file for complete search history.

(56) References Cited

U.S. PATENT DOCUMENTS

| | | | | |
|---|---|---|---|---|
| 4,451,078 A | * | 5/1984 | Maeda ................... | 296/187.12 |
| 4,512,604 A | * | 4/1985 | Maeda et al. ............... | 296/68.1 |
| 4,558,900 A | * | 12/1985 | Nagata ....................... | 296/152 |
| 5,000,509 A | * | 3/1991 | Sinnhuber et al. ..... | 296/187.12 |
| 5,110,176 A | * | 5/1992 | Curtis ................... | 296/187.12 |
| 5,328,234 A | * | 7/1994 | Daniel et al. ............... | 296/68.1 |
| 5,435,618 A | * | 7/1995 | Sacco et al. ........... | 296/187.12 |
| 5,507,554 A | * | 4/1996 | Nakano et al. ........ | 297/216.13 |
| 5,716,094 A | * | 2/1998 | Bhalsod et al. ........ | 296/187.12 |
| 6,237,991 B1 | * | 5/2001 | Weber .................... | 296/187.12 |
| 6,299,238 B1 | * | 10/2001 | Takagi et al. .......... | 296/187.12 |
| 6,299,239 B1 | * | 10/2001 | Sagawa et al. ........ | 296/187.12 |
| 6,523,893 B1 | * | 2/2003 | Kamper et al. ........ | 297/216.13 |
| 6,568,745 B1 | * | 5/2003 | Kosuge et al. ......... | 296/187.12 |
| 6,761,402 B1 | * | 7/2004 | Muraishi .................. | 297/216.1 |
| 6,955,391 B1 | * | 10/2005 | Peng ....................... | 296/146.6 |

FOREIGN PATENT DOCUMENTS

| | | |
|---|---|---|
| JP | 5-301551 | 11/1993 |
| JP | 7-266952 | 10/1995 |
| JP | 2002-321658 | 11/2002 |

OTHER PUBLICATIONS

English Language Abstract of JP 5-301551.
English Language Abstract of JP 7-266952.
English Language Abstract of JP 2002-321658.

* cited by examiner

*Primary Examiner*—Kiran B. Patel
(74) *Attorney, Agent, or Firm*—Greenblum & Bernstein, P.L.C.

(57) ABSTRACT

A lateral collision is pre-detected and an integral lateral reinforcement structure is formed between both center pillars, thereby preventing an excessive deformation of the lateral vehicle body due to the exterior impact, protecting occupants from a direct impact by the deformation of the vehicle body, and greatly improving collision stability.

3 Claims, 4 Drawing Sheets

LATERAL STIFFNESS REINFORCEMENT DEVICE OF VEHICLE BODY

CROSS-REFERENCE TO RELATED APPLICATIONS

The present application is based on, and claims priority from, Korean Application Ser. No. 10-2004-0064865, filed on Aug. 17, 2004, the disclosure of which is hereby incorporated by reference herein in its entirety.

FIELD OF THE INVENTION

The present invention relates to a device that reinforces the stiffness of a vehicle body. More particularly, the present invention relates to a lateral reinforcement device of a vehicle body that prevents an excessive deformation of the vehicle body in the case of a side collision.

BACKGROUND OF THE INVENTION

Passenger vehicles are generally configured with a mutually welded plurality of panels at the vehicle body. The stiffness of the panels is reinforced by joint numbers and formation of the inner cross-section. In order to obtain a lateral stiffness against exterior impact, a cross member having a closed cross-section is mounted and a center pillar (B-pillar) is formed in the section between the front and rear doors.

However, an excessive indentation can be made into a conventional vehicle body upon a major lateral impact due to a lack of sufficient stiffness, thus making the occupants susceptible to injury.

Thus, the vehicle floor or center-pillar is reinforced in stiffness thereof, however, the middle portion of the center-pillar has an inadequate rigidity upon a severe impact.

In the case of racing vehicles, X-shaped reinforcement pipes are occasionally installed in the vehicle body. Such pipes, however, take up a lot of room in the compartment space, resulting in inefficient use of the space in the passenger vehicles.

SUMMARY OF THE INVENTION

According to a preferred embodiment of the present invention, a reinforcement device provides a lateral stiffness against a side collision without occupying a lot of space inside the passenger compartment, thereby protecting occupants upon an excessive deformation of the vehicle body.

In one aspect, the invention provides a lateral reinforcement device of a vehicle body, including a seat back reinforcement frame that is vertically installed at a rear middle of a seat back. A first hydraulic cylinder is installed perpendicularly to the seat back reinforcement frame at the middle of the seat back reinforcement frame. Reinforcement rods protrude out from both sides of the first hydraulic cylinder. A reinforcement plate is installed in a center pillar at a corresponding disposition to one of the reinforcement rods. Second hydraulic cylinders raise a center console. A steel frame is installed around an upper portion of the center console. When the center console is raised, the steel frame contacts another of the reinforcement rods, which face the inner side of the vehicle. A solenoid valve is installed on a hydraulic supply pipe line of the first and second hydraulic cylinders. A pump provides hydraulic pressure to the hydraulic supply pipe line. A pre-crash sensor is installed at the center pillar. An Electronic Control Unit (ECU) operates an electrical seat adjustor to align the reinforcement rods to reinforcement plates of the center pillar simultaneously with the ECU opening the solenoid valve when a potential crash hazardous signal is transmitted from the pre-crash sensor.

When a side collision is expected to occur, then all reinforcement plates, reinforcement rods of left and right seats, and the middle steel frame make contact with each other and form a strong lateral reinforcement structure to cope with side collisions.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
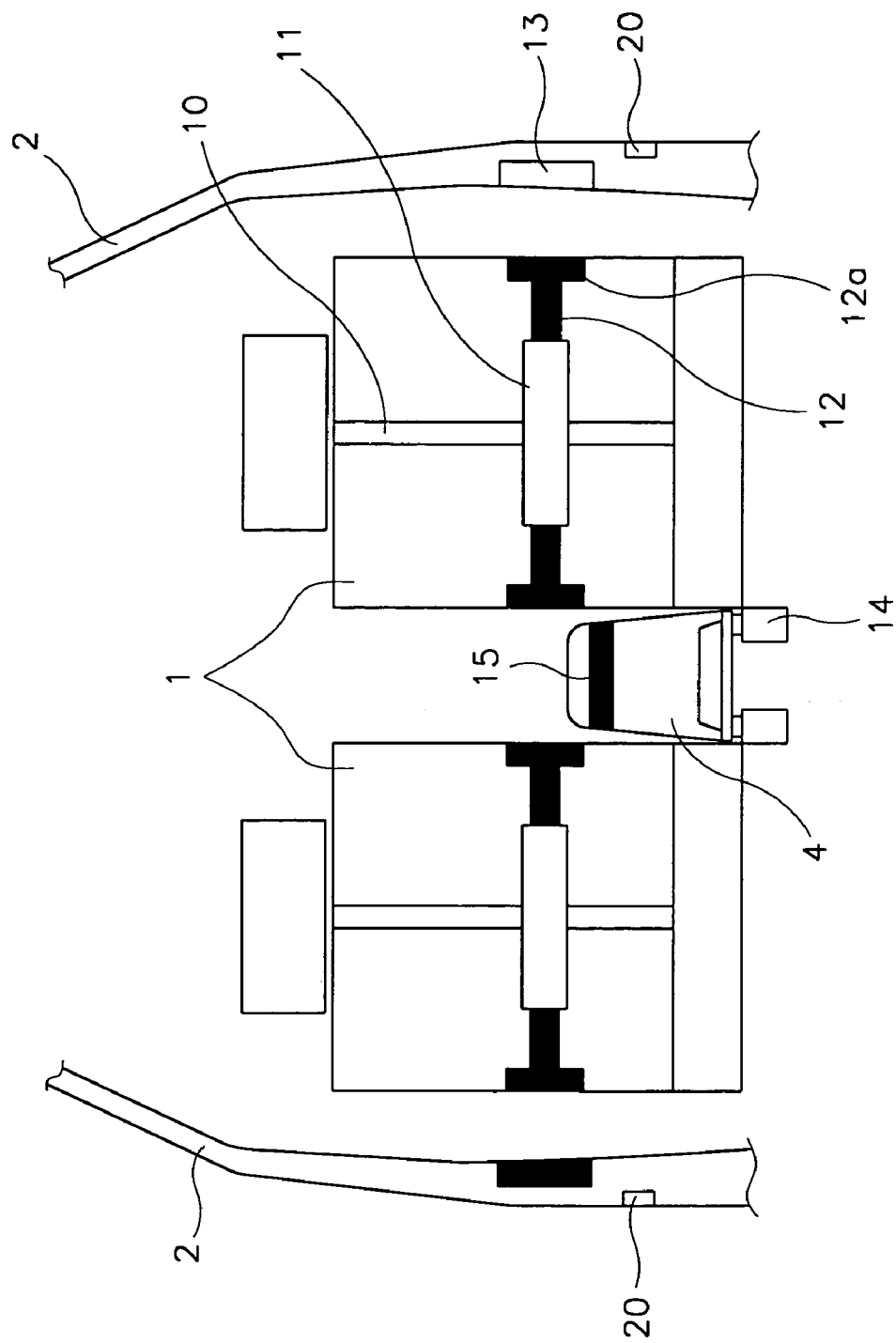
FIG. 1 is a schematic view of a lateral reinforcement device of a vehicle body according to an embodiment of the present invention.

With reference to FIG. 1, a lateral reinforcement device of the vehicle body according to an embodiment of the present invention includes a seat back reinforcement frame 10 vertically installed at the rear middle of a seat back of both seats 1 (i.e., the driver and front passenger seats). A first hydraulic cylinder 11 is perpendicularly installed at the middle of the seat back reinforcement frame 10.

The first hydraulic cylinder 11 pushes cylinder rods, installed at both sides of the hydraulic cylinder 11, toward the front direction thereof by receiving hydraulic pressure at the middle of the first hydraulic cylinder 11. Hereinafter, the cylinder rods will be called reinforcement rods 12.

The reinforcement rods 12 are integrally formed at one end thereof with a disk-shaped or rectangular plate-shaped support plate 12a in a perpendicular direction to the reinforcement rods 12.

Each center pillar 2 is equipped with a disk-shaped or rectangular plate-shaped reinforcement plate 13 at a corresponding disposition to the support plate 12a of the reinforcement rods 12, which face the exterior direction of the vehicle body among the reinforcement rods 12.

A center console 4 is mounted between the driver and front passenger seats 1. The center console 4 according to the embodiment of the present invention is secured to the vehicle body floor via second hydraulic cylinders 14.

That is, the lower portions of the second hydraulic cylinders 14 are fixed to the vehicle floor while the upper portions are affixed to the center console 4 at an upper end of a cylinder rod.

Figure 2:
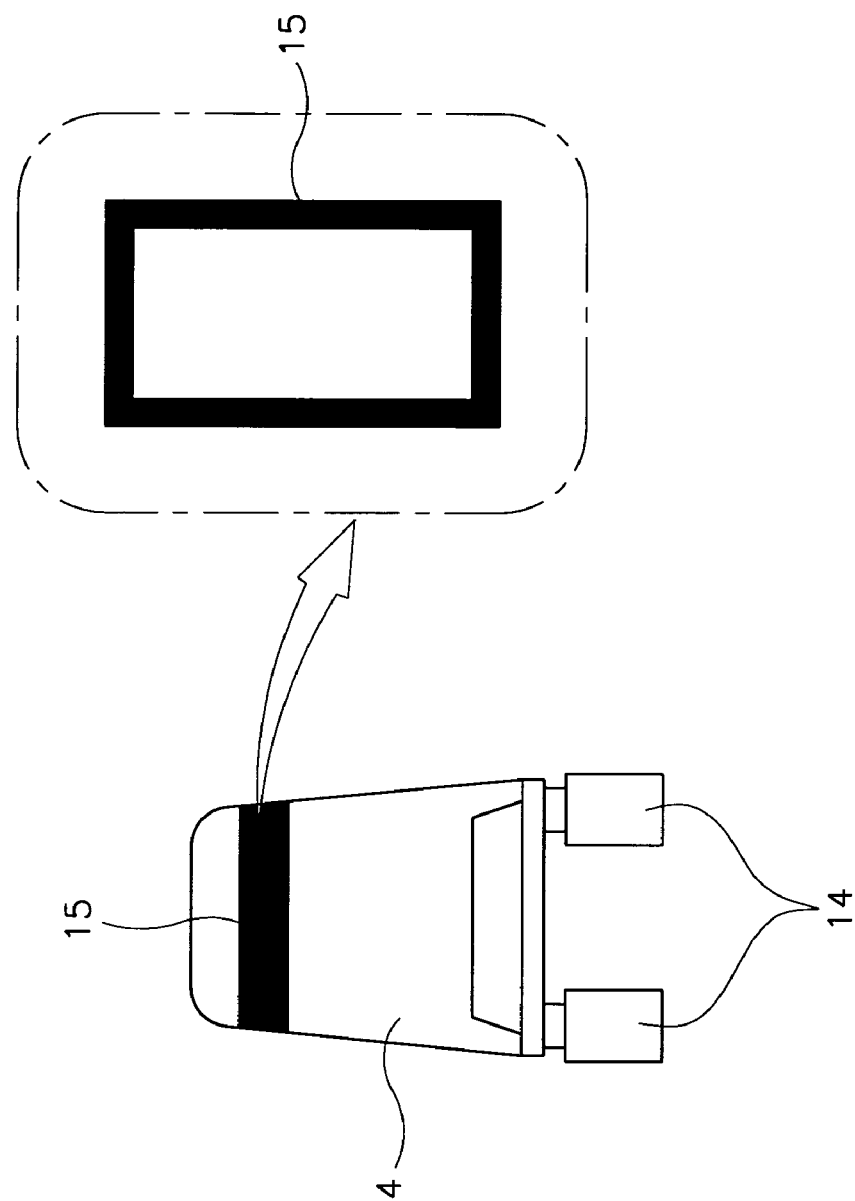
FIG. 2 illustrates a center console and a top view of a steel frame mounted around the center console.

In reference to FIG. 2, an upper portion of the center console 4 is installed with a rectangular steel frame 15 along a circumferential surface of a main body of the center console 4. When the center console 4 ascends via the second hydraulic cylinders 14, the steel frame 15 is placed at the identical level of height to the reinforcement rods 12 (that faces the inner side of the vehicle) of the first hydraulic cylinder 11.

The first and second hydraulic cylinders 11 and 14 are connected to a pump 17, which operates via the engine, through a hydraulic supply pipeline. The hydraulic supply pipeline is also installed with a solenoid valve 16.

The solenoid valve 16 is in a closed state at normal times unless electrical power is provided. If the electrical power is applied, the solenoid valve 16 is opened to supply the hydraulic pressure from the pump 17 to the first and second hydraulic cylinders 11 and 14 via the hydraulic supply pipeline.

The center pillar 2 is installed at the exterior side thereof with a pre-crash sensor 20. The pre-crash sensor 20 is constituted by an ultrasonic transceiver that pre-detects a hazardous situation right before a side collision.

Figure 3:
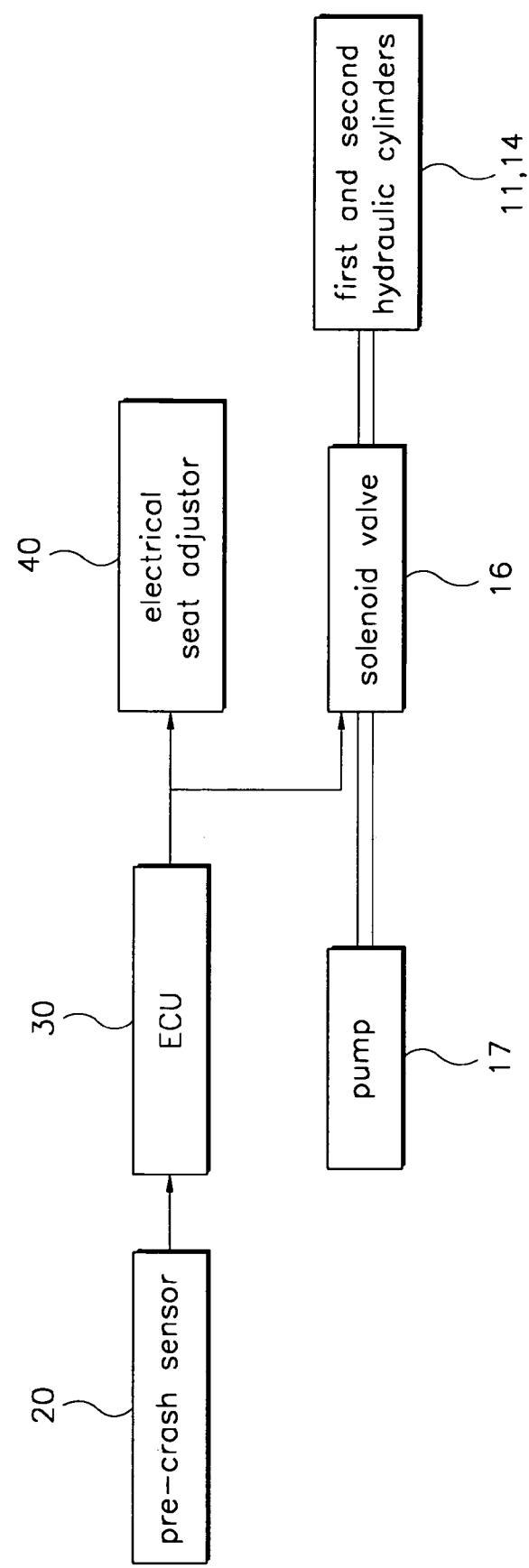
FIG. 3 is a block diagram depicting the constitution of the present invention.
Figure 4:
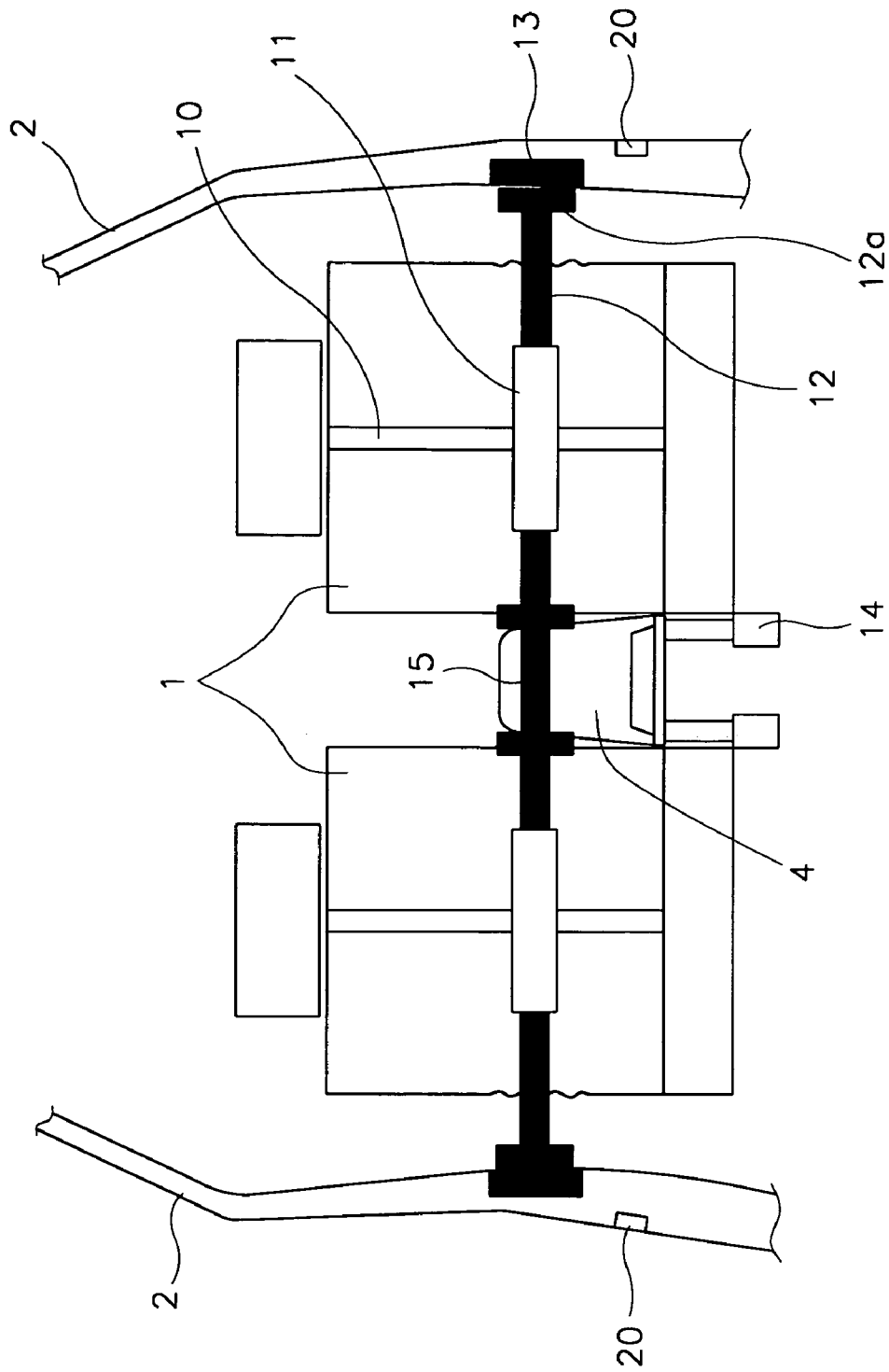
FIG. 4 illustrates an operation state of the present invention.

The hazardous detection signal of the pre-crash sensor 20 is transmitted to an Electronic Control Unit (ECU) 30 (see FIG. 3). The ECU 30 receiving the above signal operates a built-in electrical seat adjustor 40 to dispose the reinforcement rods 12 on the identical axis to the reinforcement plate 13 equipped at the center pillar 2 (achieved by pre-programming the ECU with the amount of motor operation of the electrical seat adjustor).

The ECU 30 also opens the hydraulic supply pipeline by switching on the solenoid valve 16. The first and second hydraulic cylinders 11 and 14 operate by being provided with the hydraulic pressure.

The operation of the present invention will now be described.

When a side collision is expected to take place, the pre-crash sensor 20 detects the risky situation and transmits a warning signal to the ECU 30.

The ECU 30 receiving the signal operates the solenoid valve 16 and motor of the electrical seat adjustor 40 at the same time.

The left and right seats 1 are shifted from random positions to a consistent disposition of the reinforcement rods 12 and reinforcement plate 13. Simultaneously, the reinforcement rods 12 protrude from both sides of the first hydraulic cylinder 11 by the operation of the first hydraulic cylinder 11. The center console 4 is raised by the operation of the second hydraulic cylinders 14 such that the steel frame 15 is positioned between the reinforcement rods 12 facing the inner side of the vehicle.

The support plate 12a formed at one end of the reinforcement rods 12 functions to stably contact the reinforcement plate 13 as well as the steel frame 15.

When all the reinforcement plate 13, reinforcement rods 12 and steel frame 15 contact each other, a lateral reinforcement structure is formed as one connected unit between both center pillars 2.

Accordingly, the center pillar 2 is rigidly supported via the reinforcement rods 12 and steel frame 15 in the event of a lateral collision, thereby preventing an excessive indentation of the vehicle body and protecting occupants from a severely hazardous situation.

As apparent from the foregoing, a reinforcement device of the invention provides a notable advantage in that a side collision is pre-detected and an integral lateral reinforcement structure is formed between both center pillars, thereby preventing an excessive deformation of the vehicle lateral body due to the impact, protecting occupants from direct injury by the deformation of the vehicle body, and greatly improving collision stability.

What is claimed is:

1. A lateral reinforcement device of a vehicle body, comprising:
    a seat back reinforcement frame vertically installed at a rear middle of a seat back;
    a first hydraulic cylinder installed perpendicularly to said seat back reinforcement frame at a middle of said seat back reinforcement frame;
    reinforcement rods protruding out from both sides of said first hydraulic cylinder;
    a reinforcement plate installed in a center pillar at a corresponding disposition to one of said reinforcement rods;
    second hydraulic cylinders that raise a center console;
    a steel frame installed around an upper portion of said center console, said steel frame being contacted with another of said reinforcement rods when said center console is raised, said reinforcement rods facing an inner side of the vehicle;
    a solenoid valve installed on a hydraulic supply pipeline of said first and second hydraulic cylinders;
    a pump that provides hydraulic pressure to said hydraulic supply pipeline;
    a pre-crash sensor installed at said center pillar; and
    an Electronic Control Unit (ECU) that operates an electrical seat adjustor to align said reinforcement rods to said reinforcement plate of said center pillar simultaneously with said ECU opening said solenoid valve when a potential crash hazardous signal is transmitted from said pre-crash sensor.

2. The device as defined in claim 1, wherein said reinforcement rods are integrally formed at one end thereof with a support plate in a perpendicular direction to said reinforcement rods.

3. The device as defined in claim 1, wherein said steel frame is formed in a rectangular shape along a circumferential surface of a main body of said center console.

* * * * *